M. M. MORRIS.
ROLLING PIN.
APPLICATION FILED FEB. 24, 1919.

1,325,260.

Patented Dec. 16, 1919.

Inventor
M. M. Morris
By Norman T. Whitaker
her Attorney

UNITED STATES PATENT OFFICE.

MABEL M. MORRIS, OF SPOKANE, WASHINGTON, ASSIGNOR OF ONE-THIRD TO LENNIE ETHEL LANG SUTCLIFFE, OF SPOKANE, WASHINGTON.

ROLLING-PIN.

1,325,260.  Specification of Letters Patent.  Patented Dec. 16, 1919.

Application filed February 24, 1919. Serial No. 278,783.

*To all whom it may concern:*

Be it known that I, MABEL M. MORRIS, a citizen of the United States, and a resident of Spokane, in the county of Spokane and State of Washington, have invented new and useful Improvements in Rolling-Pins, of which the following is a specification.

This invention relates to rolling pins.

An important object of the invention is to provide in a device of the above mentioned character a means whereby the curvilinear surface of the same may be maintained substantially cool to facilitate the shaping of certain pastries or the like into a desired form.

A further object of the invention is to provide in a device of the above mentioned character a means whereby a cooling medium employed in connection with the same may be easily directed into the device.

A further object of the invention is to provide a device of the above mentioned character which is simple in construction, cheap to manufacture, and effective in operation.

Other objects and advantages will be apparent from the following description.

Figure 1:
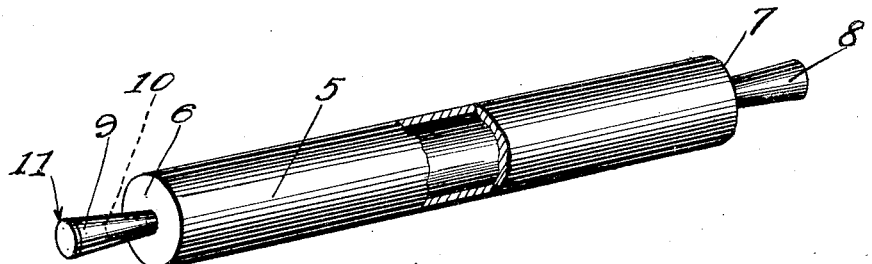
Figure 2:
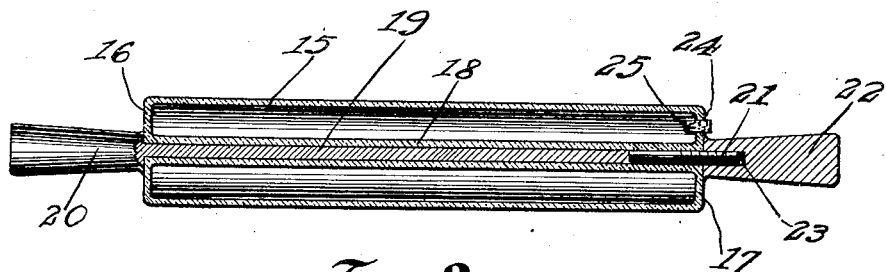
Figure 3:
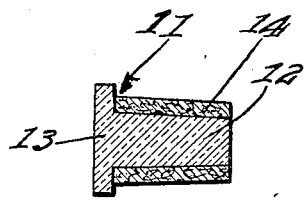

In the drawings, forming a part of the specification and in which like numerals are employed to designate like parts throughout the same, Figure 1 is a perspective view of a rolling pin embodying one form of my invention, Fig. 2 is a central longitudinal sectional view of a rolling pin embodying another form of my invention, and, Fig. 3 is a central longitudinal sectional view of a stopper.

In considering Fig. 1, wherein is shown one form of my invention, the numeral 5 indicates an elongated cylindrical, preferably glass, body constituting the main body of the rolling pin, the cylindrical body being closed at both ends as shown at 6 and 7. To the end 7 there is secured, preferably formed integral therewith, a handle 8. To the end 6 there is secured a handle 9 similar to that indicated by the numeral 8, it differing from the handle 8 only in that a passage 10 is provided centrally within the same which communicates with the cylindrical body 5. Within the passage 10 a stopper 11 is adapted to be directed therein through the passage 10. The stopper 11 comprises a glass body portion 12 provided with a head 13, the body portion 12 being surrounded by a cork bushing indicated by the numeral 14.

In considering Fig. 2, wherein is shown a second form of my invention, the numeral 15 indicates an elongated cylindrical body constituting the main body of the device. The cylindrical body 15 is closed at each end as shown at 16 and 17 and is provided centrally therein with a tube 18 extending throughout its length. Within the tube 18 there is carried a spindle 19 about which the cylindrical body 15 is adapted to rotate. One end of the spindle 19 is provided with a handle 20 preferably formed integral therewith while the other end of the handle is provided with a screw-threaded end as shown at 21, adapted to carry thereupon a handle 22, which handle is maintained in screw-threaded engagement with the screw-threaded end 21 by means of screw-threads carried by the end 21 and within the handle 22 as clearly shown at 23. A suitable cold liquid is adapted to be directed into the cylindrical body 15 through an opening 24 provided within the end 17 which opening is adapted to receive therein a cork 25 for the obvious purpose of retaining the liquid within the cylindrical body 15.

In use, a suitable cold liquid confined within the cylindrical body as hereinbefore described serves to cool the curvilinear faces of the main body and as a result of this cooling effect, certain pastries or the like may be more effectively worked or rolled into the desired shape.

It is to be understood that various changes in the shape, size and arrangement of parts may be resorted to without departing from the spirit of my invention or the scope of the subjoined claim.

Having thus described my invention, what I claim as new and desire to secure and protect by Letters Patent of the United States, is:

A device of the character described comprising an elongated hollow cylindrical main body adapted to receive therein a cooling liquid, one end of said main body being provided with an opening, means for closing said opening, an elongated central tube carried within said main body, a spindle rotatably mounted within said tube, said spindle being provided at one end with a handle and at the opposite end with screw-threads, and a second handle adapted to be screw-threaded to the end of said spindle.

MABEL M. MORRIS.